United States Patent [19]

Altenau

[11] Patent Number: 5,449,874
[45] Date of Patent: Sep. 12, 1995

[54] METHOD OF WELDING A SOFT-IRON GUIDE BAND TO A STEEL PROJECTILE BODY

[75] Inventor: Ernst-Wilhelm Altenau, Duisburg, Germany

[73] Assignee: Rheinmetall Industrie GmbH, Ratingen, Germany

[21] Appl. No.: 302,000

[22] Filed: Sep. 7, 1994

[30] Foreign Application Priority Data

Sep. 8, 1993 [DE] Germany ............. 43 30 416.8

[51] Int. Cl.⁶ ............... B21K 21/06; B23K 9/04
[52] U.S. Cl. ................. 219/76.12; 29/1.2; 102/524; 219/137 R
[58] Field of Search ............ 219/76.12, 76.14, 76.15, 219/137 R; 29/1.2, 1.22, 1.23; 102/524, 526

[56] References Cited

U.S. PATENT DOCUMENTS

| | | | |
|---|---|---|---|
| 2,813,190 | 11/1957 | Felmley, Jr. ............. | 219/76.14 |
| 2,841,688 | 7/1958 | Andreassen et al. ...... | 219/76.14 |
| 2,862,101 | 11/1958 | Klinke ..................... | 219/76.15 |
| 4,797,985 | 1/1989 | Prochnow et al. ......... | 102/524 |

FOREIGN PATENT DOCUMENTS 2093386  9/1982  United Kingdom .

*Primary Examiner*—Clifford C. Shaw
*Attorney, Agent, or Firm*—Spencer, Frank & Schneider

[57] ABSTRACT

A method of welding a soft-iron guide band on a steel projectile body includes the steps of applying a layer of nickel or a nickel alloy to the projectile body and applying a soft-iron wire as the guide band to the layer by electric protective gas welding.

5 Claims, No Drawings

METHOD OF WELDING A SOFT-IRON GUIDE BAND TO A STEEL PROJECTILE BODY

CROSS REFERENCE TO RELATED APPLICATION

This application claims the priority of German Application No. P 43 30 416.8 filed Sep. 8, 1993, which is incorporated herein by reference.

BACKGROUND OF THE INVENTION

This invention relates to a method of welding a soft-iron guide band to a steel projectile body.

It is known to affix a copper or a copper-zinc alloy guide band to a projectile body by arc welding. Since copper or copper-zinc alloys have a lower melting point than the steel of the projectile body, the bonding operation is equivalent to soldering since the steel surface is only very slightly melted if at all and is, in fact, not allowed to do so, otherwise the iron would mix with the copper melt. This would lead to an impermissible hardening of the guide band and thus would result in an increased wear of the weapon barrel. Upon firing from relatively long barrels of artillery pieces with large propellant charges, it has been found, however, that the guide bands have been worn out to such an extent as they pass through the barrel that the webs which form in the rifling profile have been entirely or almost entirely consumed. This may lead to an insufficient number of revolutions of the projectile and thus to an unstable flight, that is, to shortened trajectories with lateral deviations and, occasionally to a tumble of the projectile during flight.

It is known, as disclosed in German Offenlegungsschrift (application published without examination) 35 39 310 to mount guide bands made of copper-zinc alloys on thin-walled projectile bodies by means of flame or arc spraying to affect the thin-walled projectile body as little as possible. As an adherence layer for the guide band, for example, nickel aluminide or a cermet based on aluminum nickel oxide could be applied by spray-coating. Such a process, however, is relatively complex and expensive.

Therefore, instead of copper guide bands soft-iron guide bands have been used in order to achieve the desired properties, to thus ensure that the full guide band profile is preserved without significant changes even when the projectile is fired through a long barrel with a maximum propellant charge. If, however, the projectile body has a small wall thickness, pressing in the soft-iron guide band, as known from German Offenlegungsschrift 33 23 386 is not feasible. A securement of the soft-iron guide band by electron beam spot welding, in turn, leads to rusting underneath the guide band.

The electron beam welding, even if it is not a spot welding but is performed in the axial direction as it is known, for example, from German Offenlegungsschrift 40 39 956 for a guide band made of a copper-nickel alloy, leads to a significant hardening of the weld seam. This is so, because as the base alloy mixes with the soft iron, the resulting extremely rapid cooling in the melt zone leads to a martensite formation, possibly with fissures.

DESCRIPTION OF THE INVENTION

It is an object of the invention to provide an improved method of welding a soft-iron guide band to a steel projectile body permitting a welding of a soft-iron guide band in a simple manner on a projectile body without increasing the strength (hardness) of the guide band.

This object and others to become apparent as the specification progresses, are accomplished by the invention, according to which, briefly stated, first a thin layer of nickel or a nickel alloy is applied to the projectile body and thereafter by means of electric protective gas welding the guide band formed of soft-iron wire is bonded to the nickel or nickel alloy layer.

The nickel or nickel alloy layer may be applied by electron beam welding or explosive plating. The protective gas welding of the soft-iron guide band is expediently a TIG (tungsten inert gas) welding.

Upon welding the nickel layer, the latter mixes at the boundary zone with the material of the steel body while during the protective gas welding of the soft iron, the soft iron mixes with the upper layer of the already-applied nickel layer but does not mix with the material of the projectile body. In this manner, a large-surface mixing of the steel of the projectile body and the soft iron is prevented and the required low strength (hardness) of the guide band required for the reduction of barrel wear is preserved because the soft iron is not hardened by the steel alloy elements of the projectile body. This method is economical to a substantial extent and is particularly expedient in case of thin-walled projectile bodies.

It will be understood that the above description of the present invention is susceptible to various modifications, changes and adaptations, and the same are intended to be comprehended within the meaning and range of equivalents of the appended claims.

What is claimed is:

1. A method of welding a soft-iron guide band on a steel projectile body, comprising
   (a) applying a layer of one of nickel and a nickel alloy to the projectile body; and
   (b) applying a soft-iron wire as the guide band to the layer by electric protective gas welding.

2. The method as defined in claim 1, wherein the step of applying said layer comprises the step of electron beam welding.

3. The method as defined in claim 1, wherein the step of applying said layer comprises the step of explosive plating.

4. The method as defined in claim 1, wherein the step of applying said layer comprises the step of placing a foil of one of nickel and a nickel alloy on said projectile body and welding said foil to said projectile body.

5. The method as defined in claim 1, wherein said electric protective gas welding is a TIG-welding.

* * * * *